United States Patent [19] — Staffin et al.
[11] 3,915,657
[45] Oct. 28, 1975

[54] STEPPED DISTRIBUTOR PLATE FLUIDIZED BED REACTOR

[75] Inventors: Robert Staffin, Colonia; Richard E. Tkac, Clinton, both of N.J.

[73] Assignee: Hercules Incorporated, Wilmington, Del.

[22] Filed: May 21, 1974

[21] Appl. No.: 472,026

[52] U.S. Cl............ 23/284; 23/277 R; 34/57 A; 110/8 F; 432/58
[51] Int. Cl.². B01J 8/44; F27B 15/02; F26B 17/10; F23G 5/00
[58] Field of Search ... 23/284, 284.3, 288 S, 277 R; 110/8 R, 8 A, 8 C, 8 E, 8 F, 8 P, 28 J; 432/58; 34/10, 57 A

[56] References Cited
UNITED STATES PATENTS 3,370,938 2/1968 Newman et al................... 23/284 X
3,772,999 11/1973 Miller, Jr. et al.................. 110/8 R

FOREIGN PATENTS OR APPLICATIONS 740,974 11/1955 United Kingdom................ 23/284

Primary Examiner—Morris O. Wolk
Assistant Examiner—Roger F. Phillips
Attorney, Agent, or Firm—Michael B. Keehan

[57] ABSTRACT

A fluidized bed reactor comprises a stepped distributor plate having at least two fluidizing surfaces, one spaced below the other. This distributor plate permits improved distribution of feed over the fluidizing surfaces of the plate. Feed position between fluidizing surfaces avoids pyrolysis of feed and subsequent clogging of feed tube.

3 Claims, 5 Drawing Figures

STEPPED DISTRIBUTOR PLATE FLUIDIZED BED REACTOR

This invention relates to an improved fluidized bed reactor. More particularly, this invention relates to a fluidized bed reactor having an improved distributor plate.

A distributor plate is employed in a fluidized bed reactor as a base for supporting the bed solids employed as a heat transfer medium in the reactor. Distribution of a solids feed uniformly over the distributor plate presents a difficult problem in fluidized bed reactors. The improved distributor plate of this invention permits more uniform distribution of the feed, thus improving efficiency of the reactor. The improved distributor plate of this invention is characterized by at least two fluidizing surfaces spaced apart, one from the other.

The fluidized bed reactor of this invention incorporating said improved distributor plate is illustrated in the drawings. In the drawings, like numbers refer to like parts where applicable.

Figure 1:
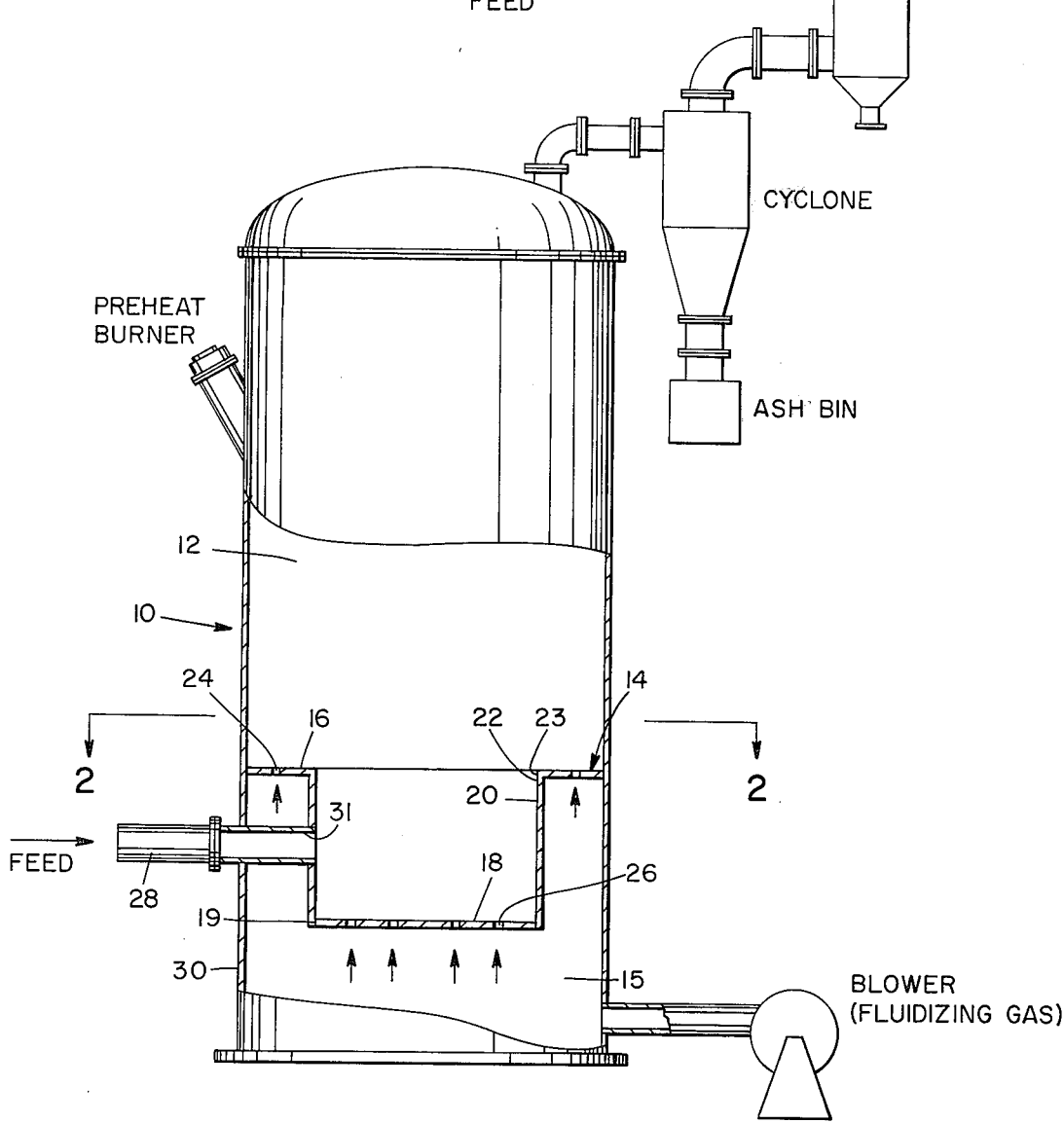
FIG. 1 is a partial cross-sectional view of a fluidized bed reactor of this invention.
Figure 4:
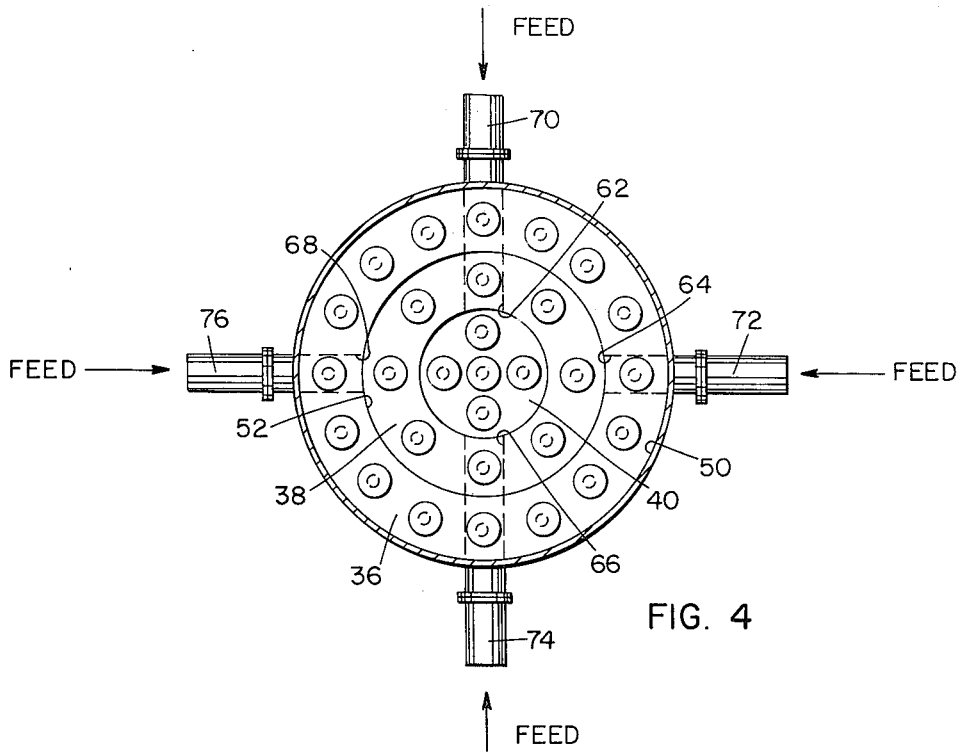
FIG. 4 is a view taken along lines 4—4 of FIG. 3.

In FIG. 1, a fluidized bed reactor body 10 is illustrated having a fluidized solids chamber 12, an improved distributor plate 14 and a plenum chamber 15. The distributor plate 14 has a first fluidizing surface 16, a base fluidizing surface 18, and a cylindrical member 20 which communicatively connects the first fluidizing surface 16 and the base fluidizing surface 18. The base fluidizing surface 18 of distributor plate 14 is in registration with an opening 22 in the first fluidizing surface 16 and is of substantially the same configuration and cross-sectional area as opening 22. Opening 22 defines an interior surface 23 in first fluidizing surface 16. Member 20 is in sealing engagement with both interior edge 23 of the first fluidizing surface 16 and the exterior edge 19 of base fluidizing surface 18. Member 20 encompasses the volume between said fluidizing surfaces 16 and 18. Both the first fluidizing surface 16 and the base fluidizing surface 18 have a series of orifices 24, 26 spaced across each fluidizing surface. Fluidizing gases pass through these orifices from the plenum chamber 15 to the fluidized solids chamber 12 of the reactor during operation of the reactor 10. Solids feed line 28 passes through side wall 30 of fluidized bed reactor 10 and connects into sealing engagement with an opening 31 in the side wall of member 20 below first fluidizing surface 16.

Figure 2:
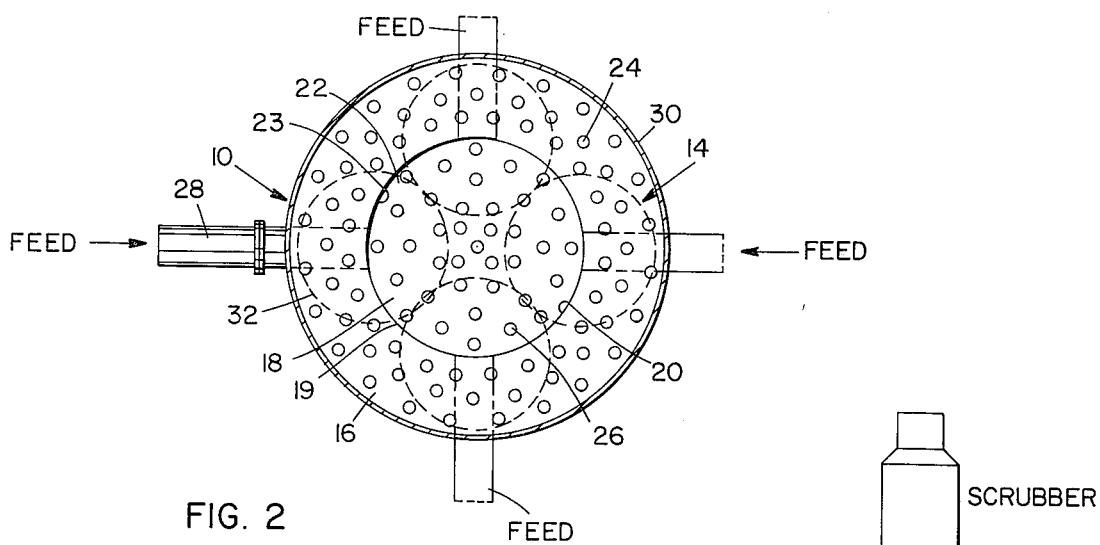
FIG. 2 is a view taken along lines 2—2 of FIG. 1 illustrating distribution of a solid feed material over the fluidizing surfaces of the improved distributor plate of this invention.

The area 32 of the distributor plate over which solid feed is distributed utilizing the distributor plate of FIG. 1 is illustrated in FIG. 2. Optional solids feed lines can be utilized, if desired, for feed distribution. These optional feed lines and the area over which the solids feed is distributed utilizing the optional feed lines are illustrated by lines drawn in phantom in FIG. 2.

Figure 3:
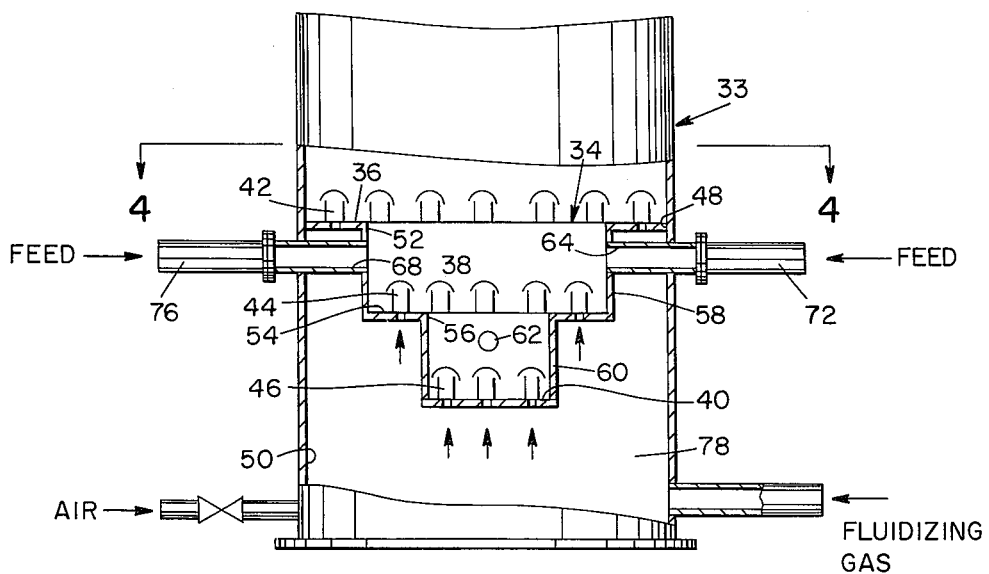
FIG. 3 is a variation of the fluidized bed reactor of FIG. 1 illustrating an improved distributor plate having three fluidizing surfaces.

In FIG. 3, another embodiment of an improved distributor plate is illustrated in fluidized bed reactor 33. The distributor plate 34 has a first fluidizing surface 36, a second fluidizing surface 38 spaced below the first fluidizing surface 36 and a base fluidizing surface 40 spaced below the second fluidizing surface 38. Tuyeres represented at 42, 44, 46 are inserted in the orifices spaced about the first, second and base fluidizing surfaces, respectively. First fluidizing surface 36 has the shape of a flat perforated disc having an exterior surface 48 which is sealed to the interior surface of reactor walls 50. The perforation or opening in surface 36 is circular and said opening defines an interior edge 52. The second fluidizing surface 38 also has the shape of a flat perforated disc and has an exterior edge 54 and an interior edge 56. The perforation or opening in the second fluidizing surface is circular. The outside diameter of surface 38 corresponds in dimension to the inside diameter of the opening in first fluidizing surface 36. The second fluidizing surface 38 is in registration with the circular perforation of the first fluidizing surface 36. Base fluidizing surface 40 is a flat plate corresponding in size and shape with the opening in second fluidizing surface 38 and is in registration therewith. The first and second fluidizing surfaces 36, 38 are connected by cylindrical member 58 which is in sealing engagement with interior edge 52 of the first fluidizing surface 36 and the exterior edge 54 of second fluidizing surface 38. Base fluidizing surface 40 is connected to the second fluidizing surface 38 by cylindrical member 60 which is in sealing engagement with interior edge 56 of second fluidizing surface 38 and with the exterior surface of base fluidizing surface 40. Cylindrical members 58 and 60 encompass the volume between the first, second and base fluidizing surfaces 36, 38, 40, respectively.

There are four feed inlets 62, 64, 66, 68 in distributor plate 34. Inlets 64, 68 are openings in cylindrical member 58. Inlets 62, 66 are openings in cylindrical member 60. Inlets 62, 64, 66, 68 are connected to a feed source (not shown) by feed lines 70, 72, 74, 76 which pass through side walls 50 of fluidized bed reactor 33 and through plenum chamber 78.

Figure 5:
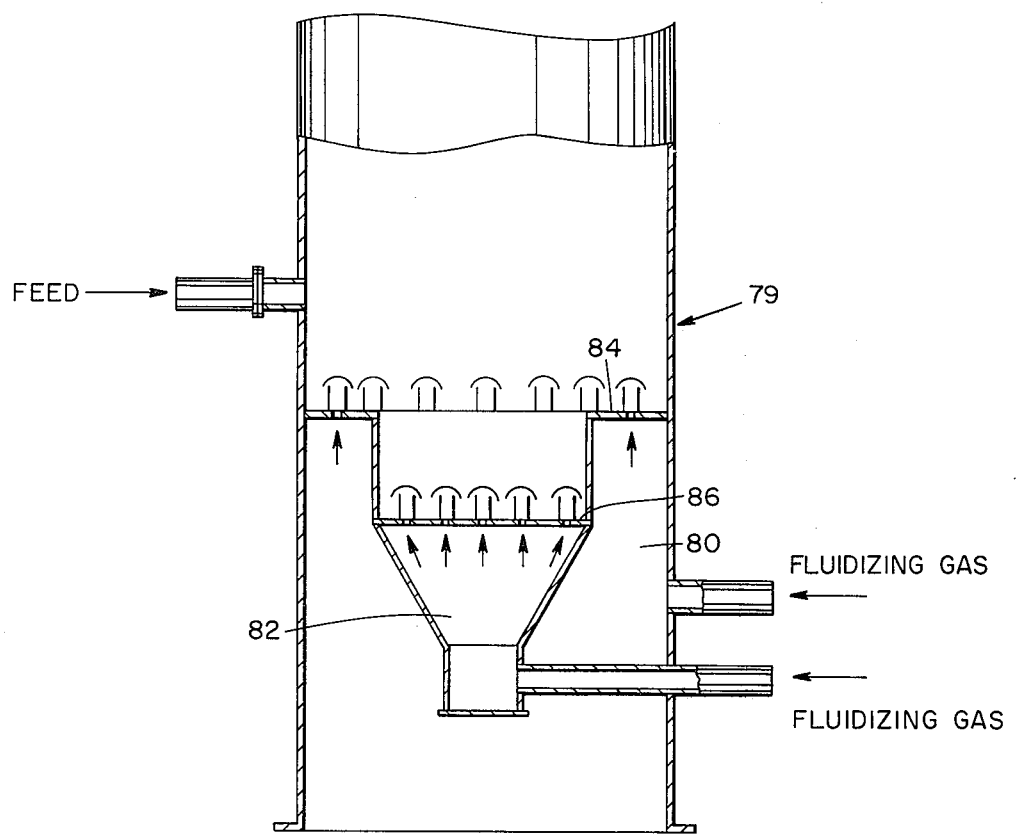
FIG. 5 is a partial cross-sectional view of a fluidized bed reactor of this invention illustrating an improved distributor plate having two fluidizing surfaces and separate plenum chambers for each fluidizing surface.

In FIG. 5 another embodiment of a fluidized bed reactor 79 of this invention is illustrated in which there are separate plenum chambers 80, 82 for each fluidizing surface 84, 86 respectively.

The fluidized bed reactor of this invention is characterized by an improved distributor plate, in which there are at least two fluidizing surfaces. In the improved fluidized bed reactor of this invention, the solids feed to the reactor is preferably discharged below the upper fluidizing surface. In the fluidized bed reactor of this invention, any of the well known methods of heating the reactor can be employed. Thus, the fluidizing gas can be preheated, the reactor plenum chamber or reactor fluidizing chamber can be heated directly by internal firing or indirectly through the use of heated jackets and the like. Any convenient combination of heating methods can be employed.

The fluidized bed reactor of this invention is particularly useful for disposition of combustible waste or sewage sludge. In a typical application, the combustible waste is pumped or screw conveyed into the reactor at a point below the first fluidizing surface. The fluid bed heat transfer material, typically silica sand, is preheated to about 1500°F. and is maintained at that temperature during operation of the reactor principally as a result of the heat of combustion of the combustibles in the waste feed. In cases where there is a high water content in the waste feed, supplementary fuel is often added to the reactor in the vicinity of the waste feed inlet so as to maintain the desired combustion temperature. The fluidized bed reactor of this invention can be readily operated substantially in the absence of air to pyrolyze combustible waste or sewage sludge.

In operation of the improved fluidized bed reactor of this invention, there is an advantage in performance is each fluidizing surface is supplied with fluidizing gas from a separate plenum chamber. The use of separate plenum chambers for each fluidizing surfaces makes the performance of the surface independent of the pressure drop at each fluidizing surface, and permits independent control of the intensity of fluidization for each fluidizing surface.

In a typical application of the improved reactor of this invention for incineration of sludge from a sewage treatment plant, the lower fluidizing surfaces of the distributor plate and the portion of the fluidized bed defined within the volume encompassed between the base fluidizing surface and the uppermost fluidizing surface can be operated at a lower temperature than the portion of the bed and reactor above the upper fluidizing surface. This approach reduces the possibility of charring or plugging of the feed to the reactor at the feed inlets to the reactor due to lower temperatures at the feed inlets. In a sewage incineration application, the temperature within the volume defined by the distributor plate is preferably operated at a temperature which is 50°-100°F. less than the average temperature in the fluidizing chamber. The temperature is principally controlled within the volume defined by the distributor plate by controlling the rate of fluidizing gas to the plate. At low flow rates, the lower portion of the fluidized bed, i.e., within the volume of the distributor plate, is most viscous in behavior and this reduces the amount of heat brought into this section of the fluidized bed by conduction from the hotter upper section of the bed.

What we claim and desire to protect by Letters Patent is:

1. In a fluidized bed reactor having in combination a reactor body, a distributor plate extending across said reactor body defining a fluidizing chamber above said distributor plate, a plenum chamber means positioned below said distributor plate in said reactor body, and a feed inlet to said fluidizing chamber, the improvement comprising a distributor plate having three fluidizing surfaces comprising a first flat fluidizing surface having an exterior edge, a circular opening defining an interior edge and a multiplicity of orifices spaced about said first fluidizing surface, the exterior edge of the first flat fluidizing surface being in sealing engagement with the interior walls of the reactor body, a second flat fluidizing surface spaced below said first fluidizing surface having the shape of a circular disc having a circular opening defining an interior edge and a multiplicity of orifices spaced about said second fluidizing surface, said second fluidizing surface being in registration with the opening in said first fluidizing surface, a base fluidizing surface spaced below the second fluidizing surface having a multiplicity of orifices spaced about said surface, said base fluidizing surface being in registration with the opening in the second fluidizing surface; a first connecting member depending from the first fluidizing surface, one end of said first connecting member being in sealing engagement with the interior edge of the first fluidizing surface and the opposite end thereof being in sealing engagement with the exterior edge of the second fluidizing surface; and a second connecting member depending from the second fluidizing surface, one end of said second member being in sealing engagement with the interior edge of the second fluidizing surface and the opposite end thereof being in sealing engagement with the exterior edge of the base fluidizing surface, said first and second connecting members encompassing the volume between the first fluidizing surface and the base fluidizing surface and a feed inlet opening in a connecting member spaced above the base fluidizing surface.

2. In a fluidized bed reactor having in combination a reactor body, a distributor plate extending across said reactor body defining a fluidizing chamber above said distributor plate and a plenum chamber means positioned below said distributor plate in said reactor body and a feed inlet to said fluidizing chamber, the improvement comprising a distributor plate having at least two fluidizing surfaces spaced apart comprising a first fluidizing surface and a base fluidizing surface spaced below said first fluidizing surface, said first fluidizing surface having an exterior edge, at least one opening through said surface defining an interior edge, and a multiplicity of orifices spaced about said first fluidizing surface, the exterior edge of the first fluidizing surface being in sealing engagement with the interior walls of the reactor body, said base fluidizing surface having a multiplicity of orifices spaced about the base fluidizing surface, a connecting member depending from the first fluidizing surface, one end of said connecting member being in sealing engagement with the interior edge of the first fluidizing surface and the opposite end of said connecting member being in sealing engagement with the exterior edge of the base fluidizing surface, said connecting member encompassing the volume between the first and base fluidizing surfaces, and a feed inlet opening in the connecting member spaced above the base fluidizing surface.

3. The fluidized bed reactor of claim 2 in which the plenum chamber means comprises a separate plenum chamber for each fluidizing surface.

* * * * *